J. ALEXANDER.
TYPE WRITING MACHINE.
APPLICATION FILED MAY 22, 1912. RENEWED OCT. 22, 1915.
1,203,836.
Patented Nov. 7, 1916.
11 SHEETS—SHEET 2.
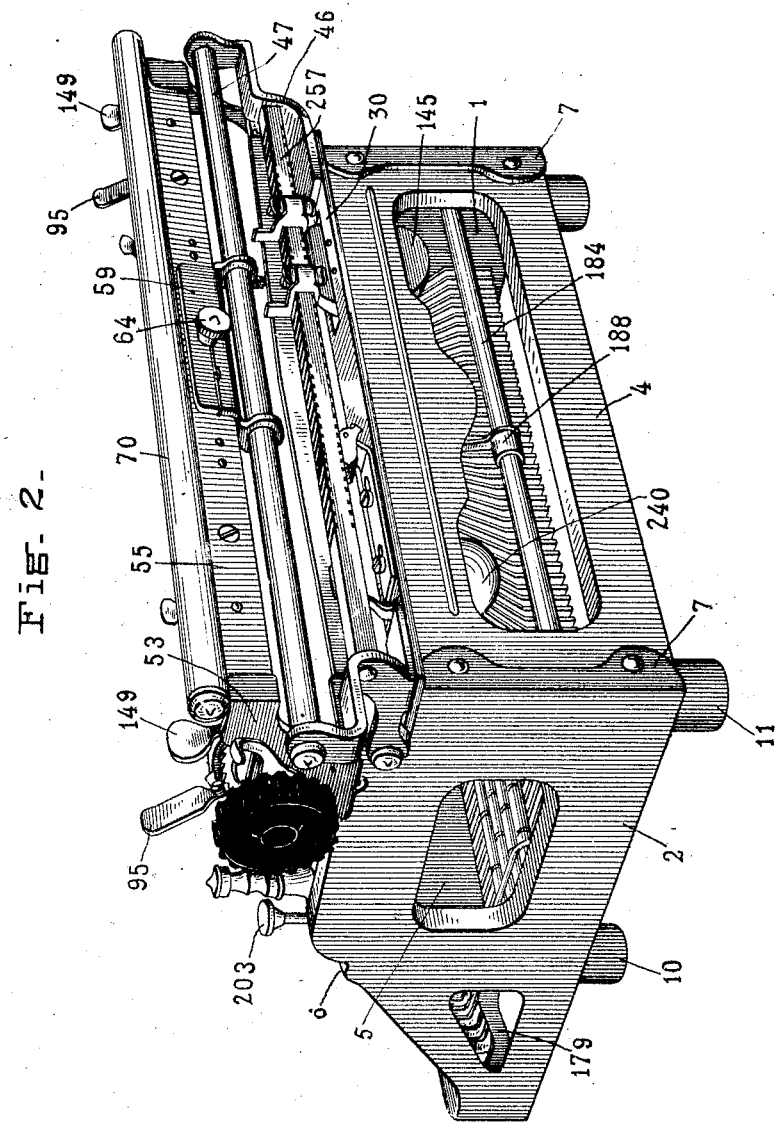
WITNESSES
INVENTOR
Jesse Alexander,
ATTORNEY

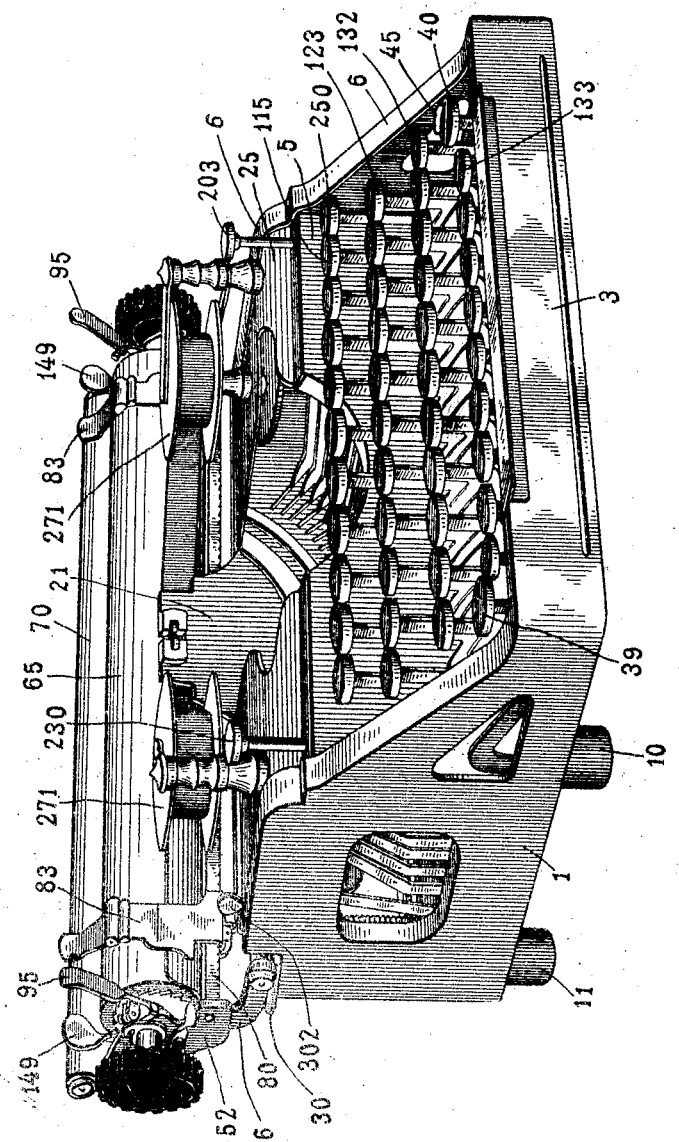

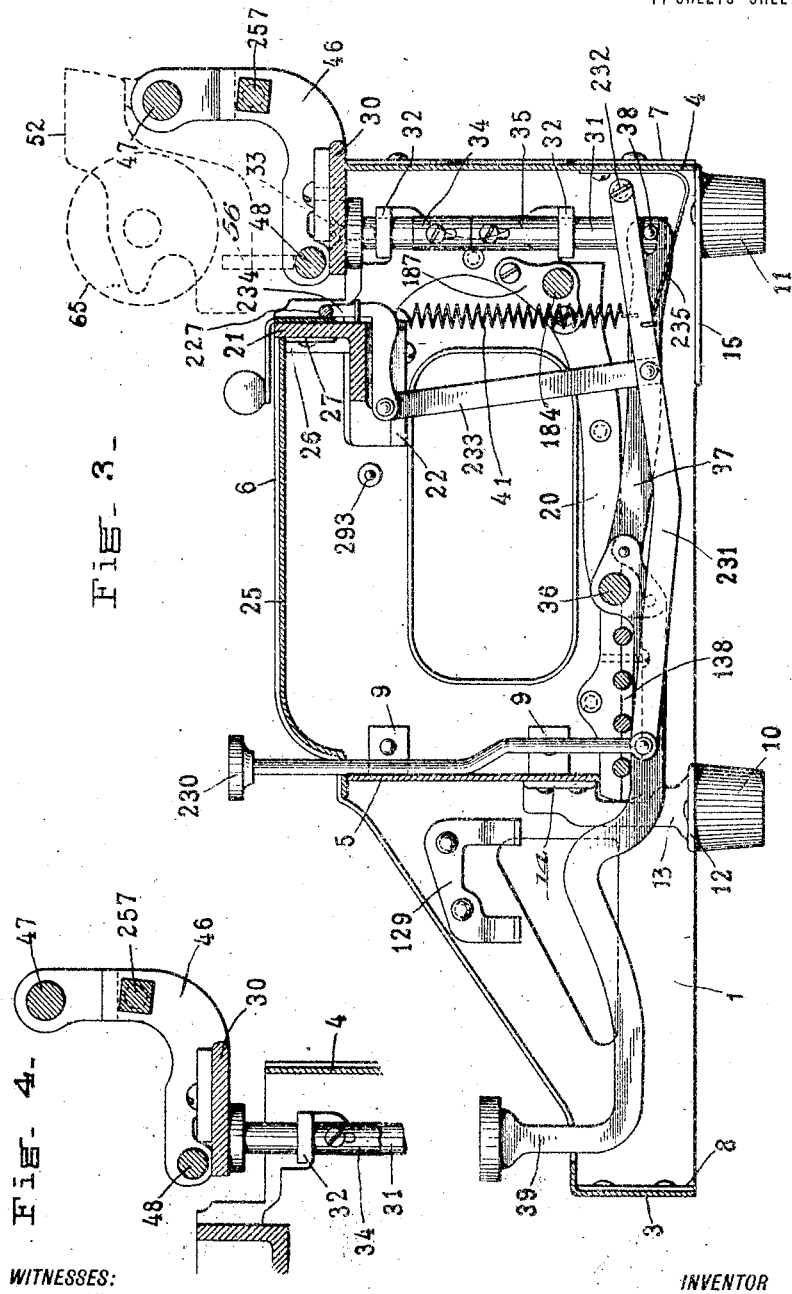

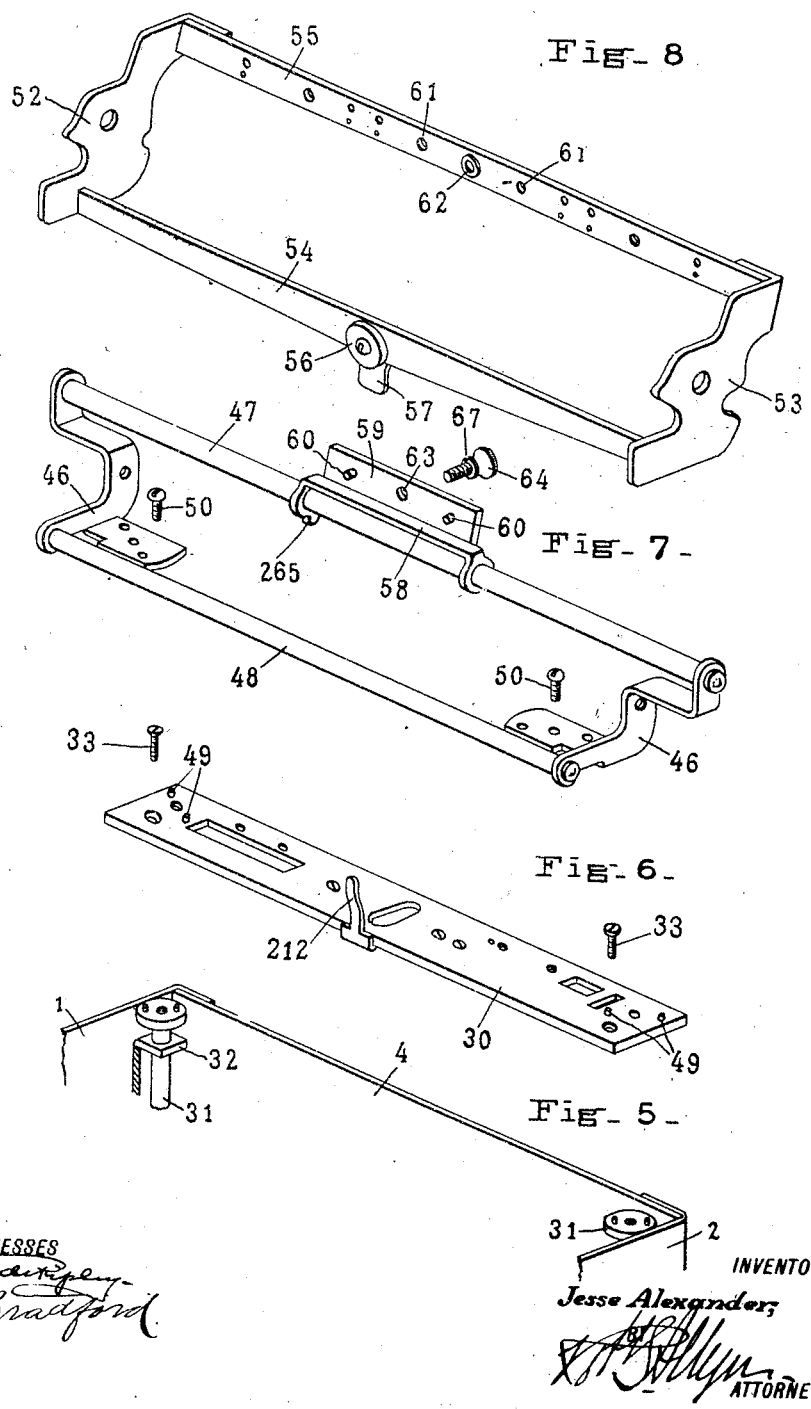

J. ALEXANDER.
TYPE WRITING MACHINE.
APPLICATION FILED MAY 22, 1912. RENEWED OCT. 22, 1915.
1,203,836.
Patented Nov. 7, 1916.
11 SHEETS—SHEET 5.
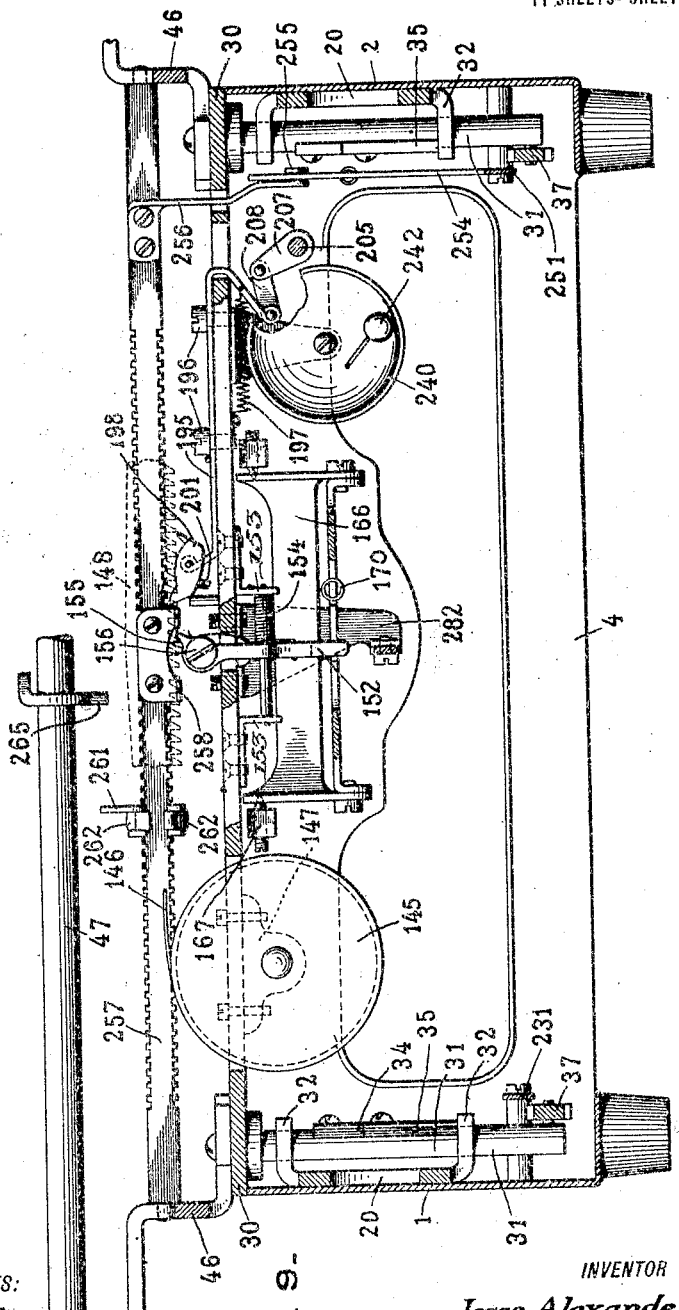
Fig. 9.
WITNESSES:
INVENTOR
Jesse Alexander,
ATTORNEY

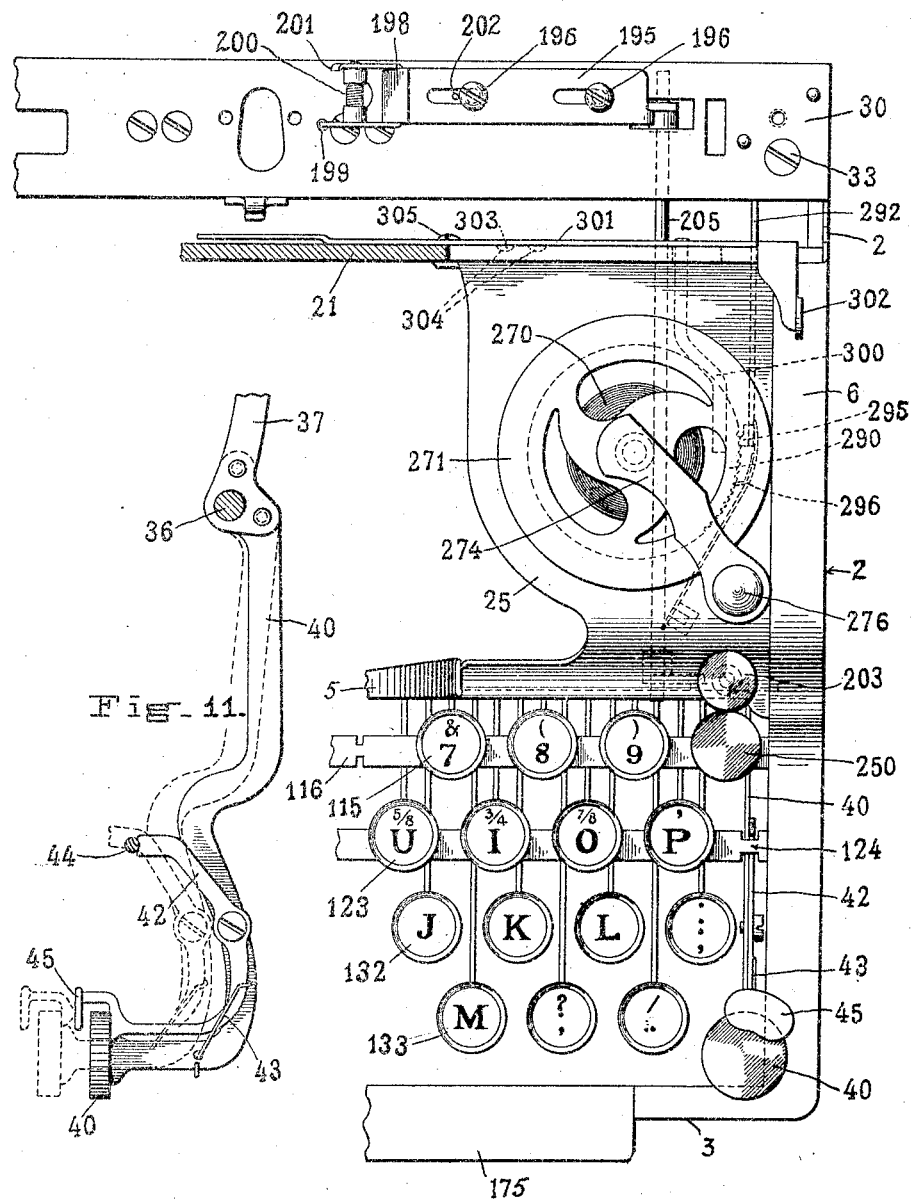

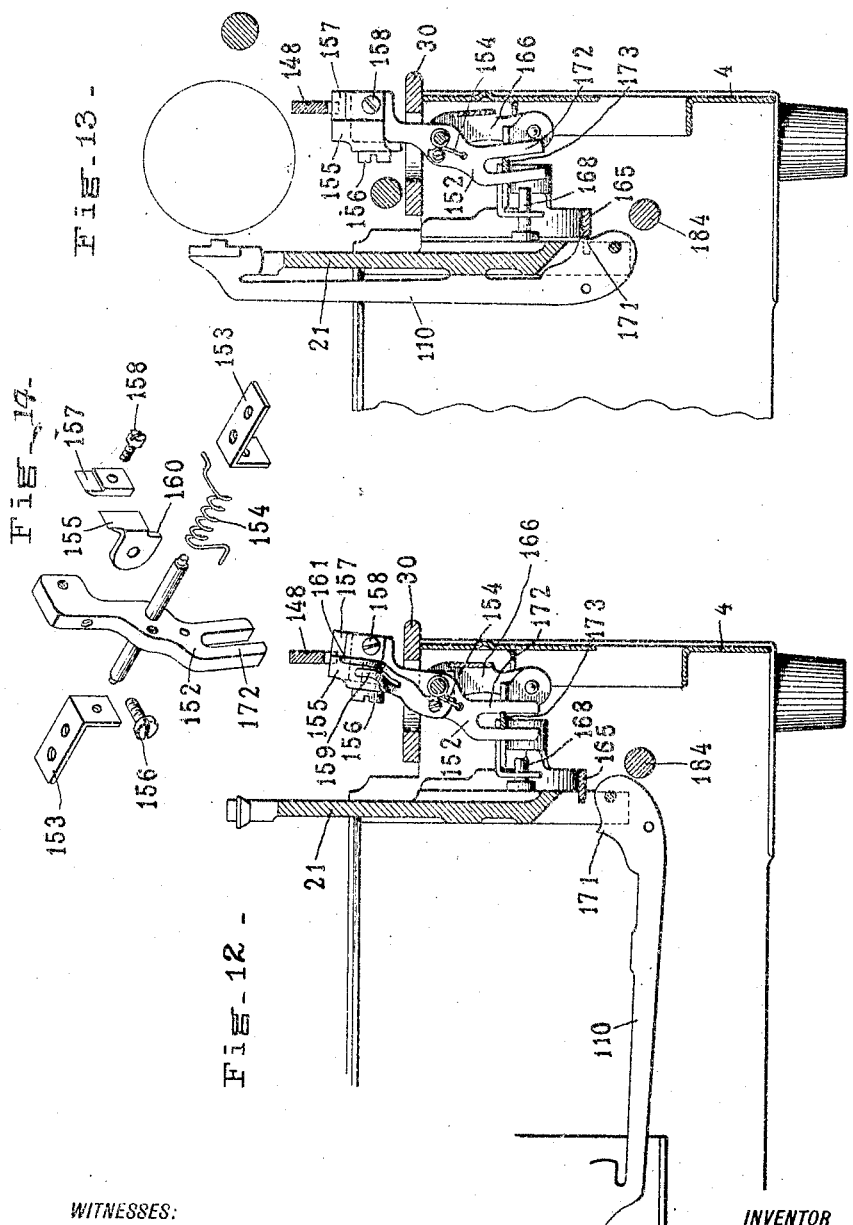

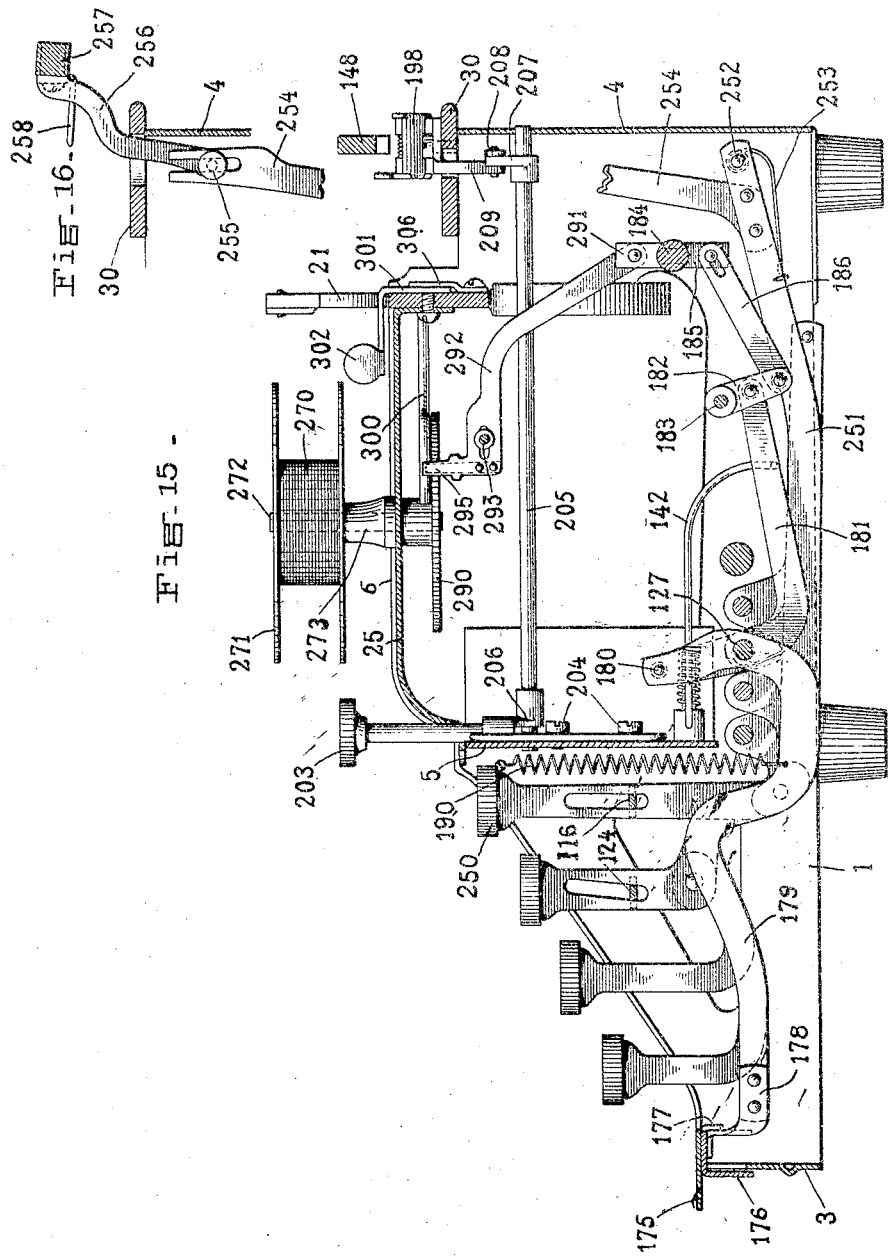

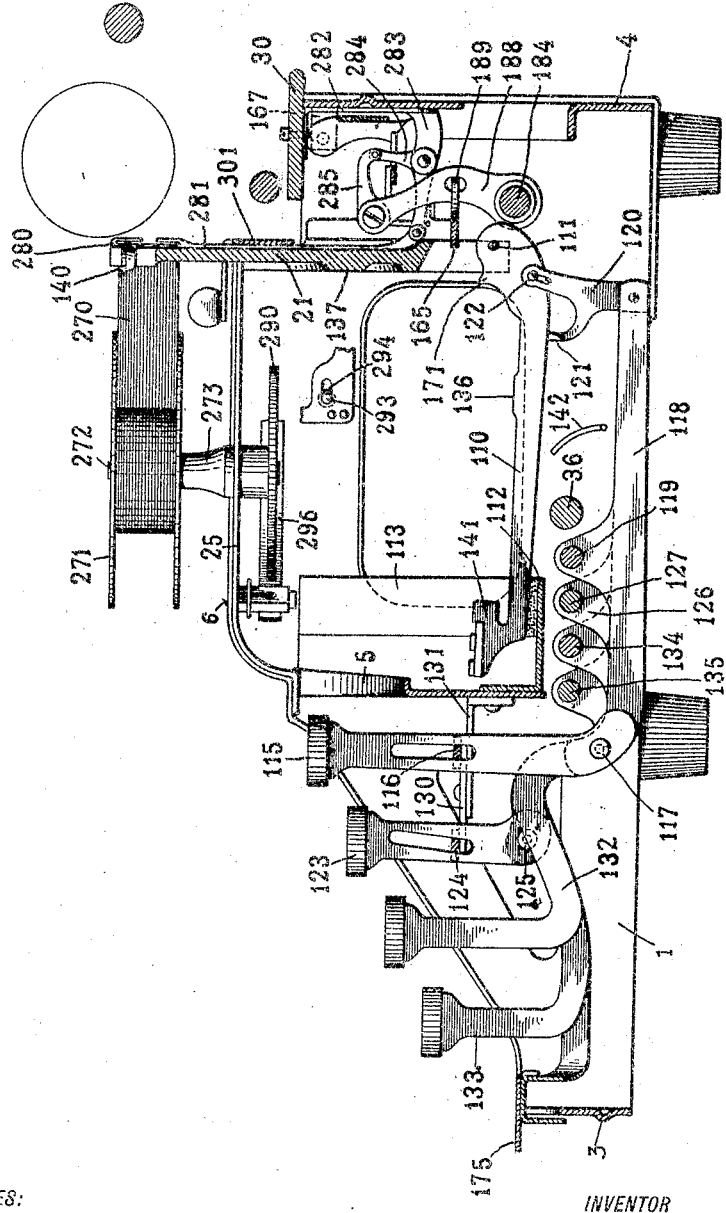

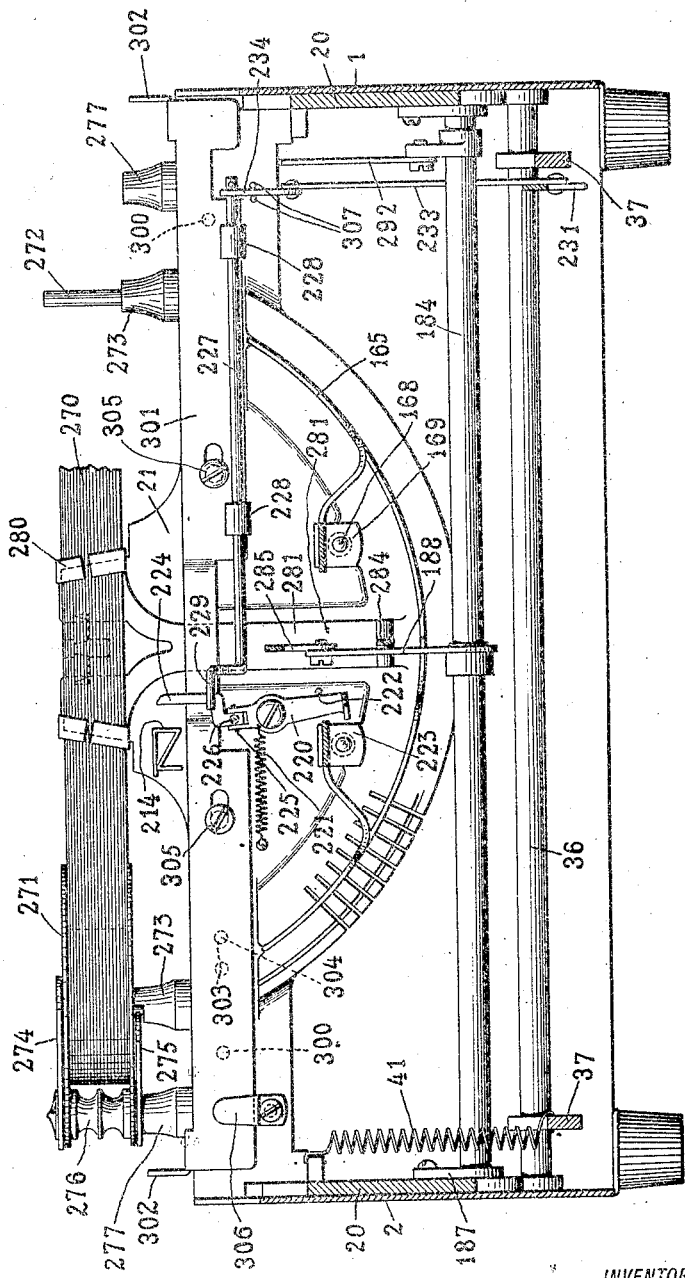

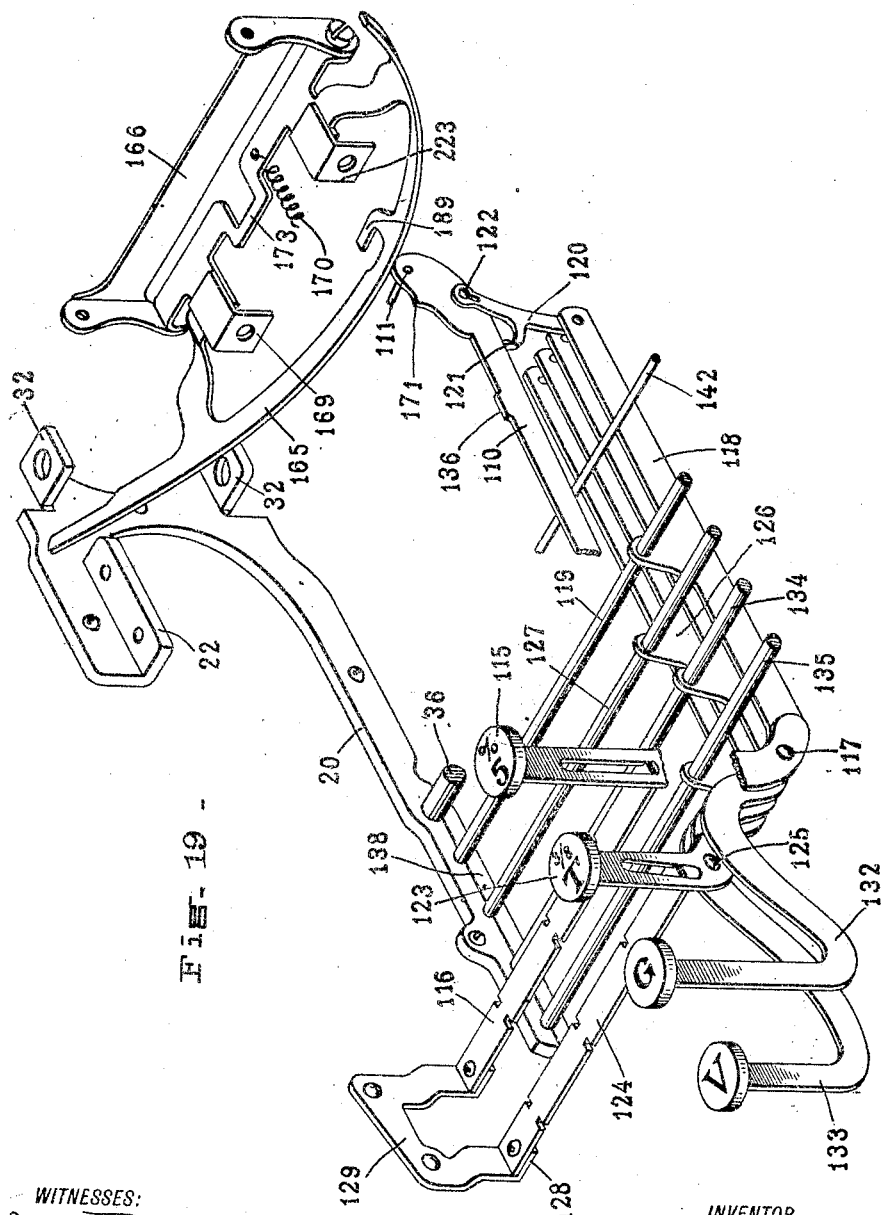

UNITED STATES PATENT OFFICE.

JESSE ALEXANDER, OF NEW YORK, N. Y.

TYPE-WRITING MACHINE.

1,203,836.

Specification of Letters Patent.

Patented Nov. 7, 1916.

Application filed May 22, 1912, Serial No. 698,879. Renewed October 22, 1915. Serial No. 57,382.

*To all whom it may concern:*

Be it known that I, JESSE ALEXANDER, a citizen of the United States, and resident of New York, in the county of Kings and State of New York, have invented certain new and useful Improvements in Type-Writing Machines, of which the following is a specification.

My invention relates particularly to what are commonly termed visible or front stroke machines.

The object is to provide a light, compact but reliable and durable machine which is ornamental and attractive in appearance and which can be made economically, and which is readily adjustable and easily operable. and by means of which it is possible to feed the carriage step, by step in either direction, jump the carriage a number of spaces by depressing a key for tabulating, also to secure automatic feed of the ribbon, reverse the direction of feed of the ribbon when desired, shift the carriage from the lower to the upper case position by either of two keys, lock it and release it readily when desired, operate the key and type bar action rapidly with an easy touch. automatically lock the type bars just before the end of the travel of the carriage, release the mechanism by a key for writing additional characters when desired, readily remove the carriage and platen, provide interchangeable carriages and platens, guide and hold the paper at the printing point, release the paper when desired, line space the paper from either end of the platen one or more spaces as desired, vary the length of the line of writing, ring the alarm bell just before the end of the line and in which the parts are assembled and maintained in proper relative position and alinement.

The invention herein claimed will be found to consist in improvements in the platen or case shifting mechanism and the parts coöperating therewith, details of which are illustrated in the accompanying drawings.

Figure 1, is a perspective view of the top, front and left side of the machine. Fig. 2, is a perspective view of the top, rear and right hand side of the machine. Fig. 3, is a vertical longitudinal sectional view showing the construction of the frame, the carriage, the platen, the platen shifting mechanism and the right hand marginal stop release. Fig. 4, is a detail view showing the carriage shifted to the upper case position.

Fig. 5, is a fragmentary perspective view showing the rear of the machine with the carriage lifting rods. Fig. 6, is a perspective view of the carriage base plate. Fig. 7, is a perspective view of the carriage frame and guide rods. Fig. 8, is a perspective view of the platen frame. Fig. 9, is a vertical sectional view looking toward the rear from a plane in rear of the type bar segment showing the carriage shifting mechanism, carriage feeding and back-spacing mechanism, tabulator stop rod and the bell mechanism. Fig. 10, is a plan view of the right hand side of the machine with the carriage frame and platen removed, showing the back-spacing mechanism, part of the ribbon mechanism and the right hand shift key and lock. Fig. 11, is a side view of the right hand shift key and its locking device. Fig. 12, is a longitudinal vertical sectional view looking toward the left and showing the universal bar and carriage escapement mechanism in the normal position of rest. Fig. 13, is a view similar to Fig. 12 showing the parts when the type bar is in the printing position. Fig. 14, is a perspective view showing the parts of the escapement dog. Fig. 15, is a longitudinal vertical sectional view showing a part of the ribbon mechanism, the back-spacing mechanism, the space bar and its connection to the universal bar and the ribbon mechanism and the tabulating key. Fig. 16. is a vertical sectional view showing the connection between the tabulating key lever and the tabulating stop bar. Fig. 17, is a longitudinal vertical sectional view showing part of the key and type bar action, the universal bar and the ribbon lifting mechanism. Fig. 18, is a vertical section and rear view showing the type bar segment, line lock, marginal release mechanism and part of the ribbon lifting mechanism. Fig. 19, is a perspective view of part of the key and type bar mechanism.

The embodiment of the invention illustrated is what is known as the double case or single shift type in which each of the type bars carries two type characters and the platen is shifted in order to bring the second set of characters into use. It will be obvious however, that while this is the preferred form of construction, parts of the invention may be utilized in single case or triple case machines.

*Frame.* (See Figs. 1, 2 and 3.)—The frame is preferably made of sheet metal stamped and drawn into the shape desired, so that the parts can be made economically and although light in weight the frame will be sufficiently rigid for the use to which such a machine is put. The frame is made up of the side plates 1 and 2, the front plate 3, the rear plate 4 and the middle plate 5. Each side plate has a flange 6 turned inwardly along its upper edge, a flange 7 turned inwardly at its rear edge and a flange 8 turned inwardly at its front end. The flange 8 of each side plate is riveted or otherwise suitably secured to the rear of the front plate 3. The flange 7 of each side plate is riveted or otherwise suitably secured to the rear of the back plate 4. The middle plate 5 has lugs or flanges 9, 9 bent rearwardly from each edge and riveted or otherwise suitably secured to the side plates. The frame is adapted to be supported by means of yielding feet such as 10 and 11. The front foot 10 is screwed to a flange 12 of the bracket 13 which has a lug 14 at its upper end screwed or otherwise suitably secured to the middle plate 5. The rear foot 11 is screwed to a flange 15 stamped inwardly from the lower edge of the side plate.

*Inner frame.* (See Figs. 3, 5 and 19.)—The bracket 20 is rigidly secured to each side plate for instance, as by riveting and serves as a support for the key levers, the platen lifting mechanism and the type bar segment so that the parts of the carriage and the key and type bar action are given their proper relative positions. The opposite ends of the type bar segment 21 are secured to the upper flanges 22 of the brackets 20 and the parts are so shaped and proportioned that parts of the ends fit against the side plates of the frame and their upper flanges.

On opposite sides of the machine are two top plates 25. The front edge of each stop plate rests on the upper edge of the middle plate 5. The side edge of each top plate fits underneath the flange 6 of the adjacent side plate and the rear edge of the top plate rests on a flange 26 of the type bar segment and has a lug 27 screwed to the type bar segment. Each top plate is thus securely held in place by means of one screw.

*Carriage construction.* (See Figs. 1, 2, 3, 4, 6, and 7.)—The entire carriage construction, the tension drum, escapement dog, back-spacing dog and bell striker are all carried by a base plate 30 at the rear of the machine. This base plate is supported by two rods 31, 31 guided at opposite sides of the machine in lugs 32, 32 formed as parts of the brackets 20, 20 previously referred to. The holes in the lower lugs are preferably slightly elongated laterally so as to prevent the rods from binding. The base plate may be detachably secured to each rod by a screw 33.

*Carriage lifting.* (See Figs. 3, 4, 5, 9, 10 and 11.)—Adjustable stops 34 and 35 are provided on the lifting rods for limiting the upward and downward movement of the rods. The shaft 36 pivoted in brackets 20, 20 has an arm 37 at each end slotted to engage a pin or projection 38 at the lower end of the corresponding lifting rod 31. Two shift keys 39 and 40 are connected to the opposite ends of the shaft 36 on opposite sides of the machine. The weight of the carriage, platen, etc., is normally sufficient to hold the parts in the lower case position. A spring or springs such as 41 is preferably provided to partially counter-balance the weight of the carriage and attached parts so that they can be more readily lifted to the upper case position by depressing either one of the shift keys 39 or 40.

*Shift key lock.* (See Figs. 10 and 11.)—Pivotally attached to the shift key 40 is a lever 42 normally tilted toward the rear by the pressure of a spring 43. Just above the key lever 40 is a stop 44 and in the normal operating position shown dotted in Fig. 11 the rear end of the lever 42 is in rear and above the stop 44. When pressure is applied on the end of the key lever 40 it is depressed and the spring 43 holding the lever 42 rearwardly, said lever is held clear of the stop 44. When however it is desired to write a series of characters in the upper case, pressure is applied on the finger-piece 45 of the lever 42 and upon the finger-piece of the key lever 40 and the key lever 40 is depressed. Pressure on the finger-piece 45 then causes the rear end of the lever 42 to snap under the stop 44 and hold the key lever depressed. To release the key lever 40 its finger-piece is depressed without touching the finger-piece 45. As soon as the pressure is sufficient to release the rear end of the lever 42 from the stop 44 the spring 43 tilts the lever 42 out from under the stop 44 and thus allows the key lever 40 to come back to its normal position.

*Guide frame.* (See Figs. 1, 2, 3, 4, 5, 6, 7.)—The frame construction consists of the base plate 30, the side brackets 46, 46, the rear guide rod 47 and the front guide rod 48. Each of the brackets 46 is secured to the base plate 30 by one or more positioning pins 49 and a screw 50 so that the brackets and guide rods are detachable for the purpose of repair or in order to substitute a wider carriage when desired.

*Platen frame.* (See Figs. 1, 2, 3, and 8.)—This frame consists of the two plates 52 and 53, the front bar 54 and the rear bar 55. The front bar carries a roller 56 which travels on the front track 48 and a guard 57 to assist in holding it in position. A guide sleeve 58 is adapted to slide back and forth on the rear track 47. This sleeve has a flange 59 with pins 60, 60 which are adapted to fit in holes 61, 61 in the rear platen frame bar 55. The rear bar 55 has an interiorly threaded bushing 62 which is adapted to project part way into the hole 63 in the guide sleeve flange and a thumb-screw 64 is adapted to pass through the hole 63 in the flange 59 and screw into the bushing 62 and draw the flange 59 tight against the rear of the bar 55. In this way the platen construction is supported on the guide rods 47 and 48. The platen 65 is rotatably carried by the side plates 52 and 53.

*Paper guide.*—An introductory paper guide 70 is secured to the back bar 55 of the platen frame and extends down beneath the lower side of the platen. Two paper guide fingers 83 are supported by the rod 80 and adapted to be moved thereon from side to side.

*Key and type bar action.* (See Figs. 17 and 19.)—The type bars such as 110 are all pivoted on a wire 111 at the rear of the type bar segment 21. The front ends rest on a pad 113 in the basket 112 which is fastened to the rear of the middle plate 5. Finger keys are arranged in four banks. Each key of the rear or inner bank for instance, 115 has a slotted engagement with a slotted cross bar 116 and is hinged at 117 to the lever 118 which is pivoted on a shaft 119. The rear end of the lever 118 is connected by a link 120 to the type bar, the connection being effected at two points first by the shoulder 121 which normally engages the lower edge of the type bar and second by the pin and slot connection 122. When the key 115 is depressed it depresses the front end of the lever 118 and raises the rear end and the link 120. In the first part of the movement the shoulder 121 raises the type bar until the lost motion in the pin and slot connection is taken up after which the connection is by means of the pin. As the shoulder is about twice the distance from the pivot 111 as the pin 122 it takes much less power to start the type bar. In this way an easy touch is provided and the pin connection makes it possible to apply great force for instance, in manifolding. Each of the second bank of keys for instance, 123 is guided by a slotted bar 124 and hinged at 125 to a lever 126 on the shaft 127 and the rear end of the lever is connected to its type bar by a link similar to 120. The slotted bars 116 and 124 are carried by flanges such as 128 at their ends which flanges are carried by the supports 129 which are secured to the side plates of the typewriter frame so that the slotted bars may be adjusted to accommodate the two rear rows of keys 115 and 123. At or about the center, the bars 116 and 124 are connected by a coupling device 130 which is adjustably secured to a bracket 131 which in turn is secured to the middle plate 5 so as to support the slotted bars intermediate their ends. The two outer rows of keys are carried directly by the outer ends of the levers 132 and 133 pivoted respectively on the shafts 134 and 135 and the rear ends of these levers are connected respectively to their corresponding type bars by means of links such as 120. It will be obvious that the connecting links such as 120 are of different lengths, those of the side rows being longer and curved so as to cooperate with the type bars at the sides. Each type bar has a shoulder 136 to engage a shoulder 137 on the front of the type bar segment to limit the stroke of the type bar. All the shafts 36, 119, 127, 134 and 135 are pivotally supported by the brackets 20 previously referred to, being held in place by a cap 138 at the lower edge of the bracket 20. By this arrangement the construction is very compact while at the same time the touch is light but powerful. While the arrangement insures good alinement I prefer also to provide guide rollers 140 just below the printing position and furnish each type bar with a flange 141 adapted to fit nicely between the rollers so as to insure absolute uniformity in the printing points of all the type bars. While the type bars normally rebound from the platen I prefer also to provide a spring pressed rod 142 above the rear end of the key levers which assists in returning the type bars and key levers.

*Carriage feed.* (See Figs. 9, 12, 13, and 14.)—The carriage is normally impelled toward the left by a suitable tension drum 145 and cord 146. This tension drum is carried by a bracket 147 which is secured to the under side of the base plate 30 which travels up and down with the rest of the carriage. The carriage supports a toothed rack 148 which for convenience in releasing is pivotally carried by arms 149, 149 which are pivoted at the opposite ends of the rod 80. A spring 150 secured to the platen frame presses down on the rack 148 so as to hold the arms 149 against stops such as 151. The escapement rocker 152 is pivotally carried by brackets 153 on the under side of the base plate 30. This rocker is normally under tension of a spring 154 which presses it toward the rear. The rocker has two pawls adapted to be interposed alternately in front of the teeth of the rack 148. The pawl 155 is pivoted to the rocker by a screw 156 and is normally in engagement with the rack when the mechanism is at rest. The pawl 157 is rigidly secured to the rocker by a screw 158. When the upper end of the rocker tilts forwardly the pawl 155 is retracted from the rack 148 and the pawl 157 is interposed in its place. The pawl 155 is then tilted toward the right by the spring finger 159 which bears against the shoulder 160 below the pivot of the pawl. The spring finger 161 presses against the pawl 155 above its pivot to provide a yielding stop so that the upper end of the pawl will be maintained in position to be interposed in front of the next tooth of the rack when the upper end of the rocker next tilts to the rear. By making the finger 161 yielding the carriage can be moved toward the right at any time, the carriage rack simply snapping over the tip of the pawl 155. The two spring fingers 159 and 161 are preferably stamped from one piece of metal so as to insure their proper relative location in assembling.

*Universal action.* (See Figs. 9, 12, 13, 17, 18 and 19.)—The universal bar 165 is mounted at the rear of the type bar segment 21 and is supported by a hanger 166 pivotally hinged from the posts 167 which project forwardly from the rear frame plate of the machine. The universal bar is also guided by two pins 168 which fit in perforated lugs 169. A spring 170 normally draws the universal bar toward the type bar segment. Each type bar has a shoulder 171 adapted to engage the universal bar as the type bar approaches the printing position. The lower forked end 172 of the rocker 152 embraces a cross-piece 173 of the universal bar hanger so that whenever the universal bar is oscillated the rocker will oscillate with it whether the carriage is in the upper or lower case position.

*Space action.* (See Figs. 15 and 17.)—The space bar 175 is carried by a channel piece 176 the front flange of which is adapted to move outside of the front plate 3 of the frame. A lug 177 is provided at the rear of the front plate to guard the space bar. The ends of the rear flange of the channel 176 are bent rearwardly at 178 and connected to arms 179. These arms 179 are pivoted at the ends of the shaft 127 and their ends extend upwardly and are hinged at 180 to links 181. These links 181 are slotted to permit them to pass the shaft 127 as shown in Fig. 15. The rear ends of the links 181 are connected to the arms 182 pivoted at 183 on opposite sides of the machine. The shaft 184 extending across the rear end of the machine has two arms 185 connected by links 186 to the arms 182. This shaft 184 is pivoted in bearings 187 (see Fig. 3) which are secured to the opposite brackets 20, 20 previously referred to. An arm 188 (see Fig. 17) is secured to the shaft 184 near the middle of the machine and has a slot to receive the hook 189 at the rear of the universal bar 165. Depression of the space bar 175 tilts the arms 179 on the shaft 127, rocks the pivot 180 forward, thus draws the link 181 forward, thus tilts the arm 182 forward, draws the link 186 forward, rocks the shaft 184 clockwise so as to tilt the arm 188 rearwardly and move the universal bar and escapement accordingly. Springs such as 190 may be employed for returning the space bar and attached mechanism to the normal position of rest.

*Back spacing.* (See Figs. 2, 9, 10 and 15.)—As previously stated the carriage is normally held by the escapement mechanism against the pull of the tension drum. As it is sometimes desirable to move the carriage backward one or more spaces I have provided key controlled means for this purpose. A slide 195 is supported on the base plate 30 and guided by two screws 196. The spring 197 normally draws the slide toward the left. A pivoted pawl 198 carried by the slide is normally held depressed by the stop 199 under its left hand end. When the slide and pawl are drawn toward the right the spring 200 raises the right end of the pawl into engagement with the teeth of the rack 148 as soon as the left hand end of the pawl is disengaged from the stop 199. Continued movement of the slide toward the right draws the rack and carriage with it so that the teeth of the rack snap over the yielding pawl 155 of the escapement. The shoulder 201 at the rear of the pawl 198 acts as a stop against the end of the slide 195 to limit the upward movement of the right hand end of the pawl. The pin 202 limits the movement of the slide toward the right. The back spacer is operated by a key 203 which passes through the front of the top plate 25 (see Fig. 1). The lower end of the key 203 is guided by two screws 204 at the rear of the middle plate 5. A shaft 205 pivoted in the back plate 4 and the middle plate 5 has a crank arm 206 at its front connected by means of a pin and slot to the key 203 and an arm 207 at its rear connected by a link 208 to an extension 209 from the slide 195. It will be seen from Fig. 9 that the depression of the key 203 rotates the shaft 205 clockwise and draws the slide 195 toward the right and that when the key is released the spring 197 returns the parts to their normal position of rest.

*Marginal stops.* (See Figs. 1, 3, 6, and 18.)—The front edge of the base plate 30 carries an upwardly projecting finger 212 which serves as an abutment for the marginal stops such as 214 on the rod 80 when the carriage is moved toward the right and toward the left respectively.

*Line lock.* (See Fig. 18.)—In order to prevent the piling up of one letter on top of another when the end of the line is reached I provide an automatic locking device. The lever 220 pivoted to the back of the type bar segment is normally under tension of the spring 221 which holds it against the stop 222. The lower end of the lever is adapted to be interposed in rear of the shoulder 223 of the universal bar 175. The upper end 224 normally projects in the path of movement of the marginal stop 214 so that when the carriage moves from right to left the stop 214 engages the upper end 224 of the lever 220 and tilts the lever toward the left as viewed from the front of the machine or toward the right as viewed in Fig. 18 so that the lower end is interposed in rear of the shoulder 223 of the universal bar. This prevents the operation of the universal bar and consequently prevents the type bars from moving to the printing point. As it is sometimes desirable to write a few letters after reaching the calculated end of the line I provide mechanism for releasing the lock just described.

*Line lock release.* (See Figs. 1, 3, and 18.)—The upper end 224 of the line lock lever 220 is pivoted at 225 to the body of the lever and is normally pressed to the rear by a spring 226. A shaft 227 pivoted in the bearings 228 has a finger 229 projecting in the rear of the upper end 224 of the locking lever. A key 230 is connected to a lever 231 which is pivoted at 232 in the rear of the machine. This lever is connected by a link 233 to an arm 234 of the shaft 227. A spring 235 holds the parts yieldingly in their normal position. Depression of the key 230 depresses the lever 231 and moves the finger 229 forwardly so as to bring the end 224 of the locking lever forward out of the path of movement of the stop 214 on the platen. The spring 221 immediately pulls the end 224 toward the right as viewed from the front of the machine. The platen is then free to move toward the left.

*Bell striker.* (See Fig. 9.)—In order to give an alarm or signal when the carriage is about to arrive at the end of the usual writing line, is provided a bell 240 and an automatic striking mechanism including a hammer 242 all supported on the lower side of the base plate 30 of the carriage.

*Tabulating mechanism.* (See Figs. 2, 7, 9, 15, and 16.)—When it is desired to move the carriage from right to left for tabulating purposes the usual escapement is thrown out of action by the use of a key 250. The lower end of this key is hinged to the front end of the lever 251 pivoted at 252 and normally sustained by a spring 253. This lever has an arm 254 which is forked at its upper end to engage the pin 255 on the lower end of the arm 256. The latter is secured to a bar 257 which is pivoted in the carriage brackets 46, 46. The center of this bar carries a hand 258 which has fingers extending forward on opposite sides of the escapement pawls. When the key 250 is depressed it depresses the lever 251 and rocks the arm 254 forward so as to turn the bar 257 clockwise, as viewed from the right of the machine, sufficiently to raise the carriage rack 148 out of engagement with the escapement pawls. The carriage is then free to move toward the left, as viewed from the front, under the pull of the tension drum except as retarded by the friction between the hand 258 and the rack 148. To stop the carriage at the point desired a tabulating stop is employed or more than one may be provided when it is desired to arrange for tabulation in more than one column. The tabulating stop consists of a body having a stop shoulder 261 and jaws 262 gripping the rod 257. The guide 58 which travels with the platen on the guide rod 47 has a depending shoulder 265 which is adapted to engage the shoulder 261 of the tabulating stop when the tabulating key is depressed and the tabulator rod and stop are tilted toward the rear into the path of movement of the shoulder 265 and thus stop the carriage at the position determined by the tabulating stop.

*Ribbon mechanism.* (See Figs. 10, 15, 17 and 18.)—The ribbon 270 is wound on two spools at the left and right of the machine respectively such as 271. Each spool is supported on a shaft 272 which rotates in a bearing 273 carried by the corresponding top plate 25. Two arms 274 and 275 are carried by a shaft 276 which is supported in a bearing 277 in the top plate 25. The arm 274 stands over the upper end of the ribbon shaft 272 to hold the spool 271 in place while the lower arm 275 presses against the shaft 272 and serves as a stop and also a retarding friction on the shaft and spool. Adjacent the printing point the ribbon is guided by a frame 280 which is supported by a vibrator 281. Normally the vibrator holds the frame and ribbon down below the printing point so that the line of writing is visible. Suspended from the bottom of the carriage base plate 30 is a bracket 282 having a forwardly projecting arm 283 to which is pivoted a bell crank lever 284. The horizontal arm of this lever is pivotally connected to the lower end of the vibrator 281. The vertical arm of the bell crank lever 284 is connected by a link 285 to the upper end of the arm 188 previously mentioned as connected to the universal bar 165 so that when the universal bar is moved to the rear by the action of the type bar the arm 188 is oscillated to the rear, pushes the link 285 to the rear and with it the vertical arm of the bell crank 284 and thus lifts the horizontal arm of the bell crank 284 by the pivot of the bell crank so as to raise the vibrator 281 and the guide frame 280 and the ribbon in front of the printing point. It will be known from this construction that when the carriage is shifted from the lower to the upper case position the bracket 282 and arm 283 are raised with the base plate 30 and other parts of the carriage and thus the bell crank and its pivot are raised. At the moment of lifting of the carriage the universal action is stationary, consequently as the path of the bell crank moves straight upward and its connection to the link 285 moves substantially vertical, the horizontal arm of the bell crank and the vibrator 281 are correspondingly moved vertically so as to raise the ribbon an amount corresponding to the lifting of the carriage and the platen.

*Ribbon feed.* (See Figs. 10, 15 and 17.)— On the lower end of each ribbon shaft is a ratchet wheel 290. Connected to arms 291 at opposite ends of the shaft 184 are pawls 292 which have slotted portions guided by pins 293. This pawl is pressed toward its ratchet by a spring 294 on the pin 293 and has a spring tooth 295 for engaging the teeth of the ratchet so that as the universal bar is operated and the shaft 184 is oscillated as previously mentioned, the arm 291 is oscillated and the pawl feeds the ratchet and corresponding spool one tooth at a time. A spring pawl 296 is adapted to engage the ratchet 290 to prevent it from rotating backward. When the right hand feed pawl is in action the corresponding retarding pawl is in action so that the movement of the right hand ribbon spool is controlled. When the right hand ribbon spool is being rotated the left hand ribbon spool is disconnected from the feeding mechanism. The disconnection is effected by a finger 300 which engages the upper end of the feeding pawl and holds it out of engagement with the ratchet. The feeding pawl also holds the retarding pawl away from the ratchet so that the corresponding ratchet and ribbon spool are free to rotate. One of these disengaging fingers 300 is provided on each side of the machine and they are carried by a bar 301 at the rear of the type bar segment. This bar 301 has two finger pieces 302 at opposite ends for manual operation. A projection 303 carried by the bar is adapted to snap into one of two recesses 304 in the back of the type bar segment to hold the bar yieldingly in either the right or left hand position. The bar may be supported by one or more screws 305 and guides 306 may be provided as additional support and protection. For convenience of manufacture it will be noted that the bearings 228 for the shaft 227 are formed from the lower edge of the bar 301. To prevent the crank arm 234 and the shaft 227 from being shifted when the bar 301 is shifted, I may provide pins 307 at the rear of the type bar segment.

What I claim is:—

1. In a typewriter, shift key locking mechanism, comprising a pivoted key lever having a finger piece, a locking lever provided with a rearward extension pivoted to said key lever and having a finger piece adjacent to and overlying the finger piece of the key lever whereby to be operated by the same finger which is used to operate the key lever, a spring normally holding the finger piece of the locking lever in a raised position and a stationary stop adapted to be engaged by the rearward extension of said locking lever when the finger-piece of the locking lever is depressed to carry the rearward extension of the lever forward to a position beneath the stop.

2. In a typewriter, a frame, a vertically movable base plate at the rear thereof, a platen construction carried by said base plate and vertically movable therewith, an escapement rocker carried by said base plate, a universal bar mounted in said frame, said rocker and said universal bar having a sliding connection permitting said rocker to be moved up and down with said base plate and means for vertically moving said base plate, the escapement rocker and platen construction up and down.

3. In a typewriter, a frame, a movable base plate, guide rods detachably supported by said base plate, a guide slidably engaged on one of said rods, a platen construction detachably secured to said guide and having a roller supported on the other rod and means for raising and lowering said base plate.

4. In a typewriter, carriage shift key locking mechanism, comprising a key lever having a finger piece, a locking lever pivoted at a point intermediate its length to said key lever and having a part extending forwardly and upwardly from the pivotal support terminating in a finger piece adjacent to and overlying the top of the finger piece of the key lever to be thereby operated by the same finger which operates the finger-piece of the key lever, said locking lever having a part extending rearwardly and upwardly from the pivotal support, a spring normally holding the finger piece of the locking lever in a raised position, and a stop adapted to be engaged by the rearwardly extending part of said locking lever.

5. In a typewriter, the combination of a main supporting frame, brackets mounted in the interior of said frame, a base plate, a platen construction carried by said base plate and transversely movable relatively thereto, lifting plungers vertically guided in said brackets for raising and lowering said base plate and platen construction and a platen shifting key pivotally carried by one of said brackets and operatively connected with one of said plungers whereby a constant alinement and relation is maintained between said platen shifting key and said vertically movable plunger within said frame.

6. In a typewriter, the combination with a main supporting frame, of an inner frame consisting of brackets secured to the inner side of the side members of the main frame, key levers pivotally supported between the forward ends of the brackets, a type bar segment supported between the upper portions of the brackets, type bars supported in said segment and arranged to be operated by the key levers and a carriage construction shiftably supported by the rearward portion of the brackets.

7. In a typewriter, the combination with a frame, plungers guided for vertical movement on said frame, a base plate supported on top of said plungers, a transversely movable carriage mounted on said base plate, a rack on said carriage, an escapement rocker pivotally mounted on the base plate and coöperating with the rack on the carriage, a universal bar on the frame, said rocker having a dependent extension in vertical slidable engagement with said universal bar whereby said escapement rocker is operated irrespective of the vertical shifting movement of the carriage in respect to the frame, a back spacing device mounted on the base plate and provided with a dependent extension and key actuated means engaging said dependent extension to operate the back spacing device irrespective of the vertical shifting movement of the base plate.

8. In a typewriter, a main frame, a base plate carried thereby and vertically movable thereon, a tabulator rod supported by said base plate, a platen supported by said base plate and transversely movable relative thereto, mechanism carried by said frame having sliding connection with said tabulator rod for operating the tabulator rod irrespective of the movement of the base plate, and means for shifting said base plate, tabulator rod and platen vertically.

9. In a typewriter, a main frame supporting an inner frame comprising brackets secured to the side members of the main frame and having inwardly projecting spaced guide lugs, plungers guided for vertical lifting movement in the said guide lugs, a base plate carried by the plungers, a transversely movable platen supported on the said base plate, shift key levers pivoted in the brackets of the inner frame and connected to operate the plungers and stops adjustably secured on the plungers between the spaced guide lugs.

10. In a typewriter, the combination of a main supporting frame, of an inner frame consisting of brackets secured to the inner side of the side members of the main frame, a type bar segment supported between the upper portions of the brackets, type bars supported in said segment and a carriage construction shiftably supported by the rearward portion of the brackets and thereby maintained in constant relation to the segment and type bars which also are supported by said brackets.

11. In a typewriter, the combination of a main supporting frame, of an inner frame consisting of brackets secured to the inner side of the side members of the main frame, a type bar segment supported between the upper portions of the brackets, type bars supported in said segment, a carriage construction shiftably supported by the rearward portion of the brackets and thereby maintained in constant relation to the segment and type bars which also are supported by said brackets and shift key levers pivotally supported by the brackets and connected with the carriage for shifting the same.

12. In a typewriter, a main supporting frame, brackets secured on the inside of said frame having inwardly extending supporting flanges and inwardly projecting spaced guide lugs, a type bar segment secured to the flanges of the brackets and a shiftable carriage construction including plungers guided for vertical shifting movement in the spaced guide lugs of the brackets.

JESSE ALEXANDER.

Witnesses:
E. BRADFORD,
J. CLYDE RIPLEY.